No. 876,695. PATENTED JAN. 14, 1908.
F. CULBERTSON.
OIL ATTACHMENT FOR HANDSAWS AND THE LIKE.
APPLICATION FILED JUNE 24, 1907.
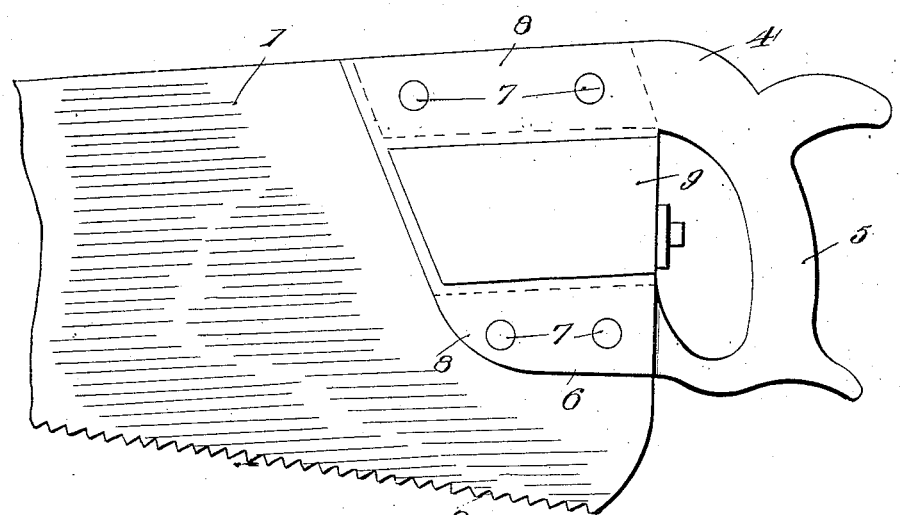
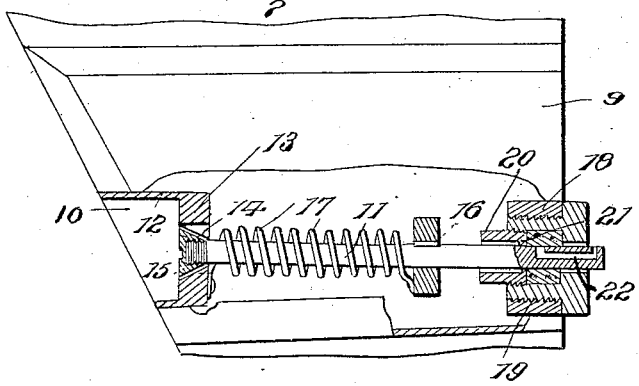
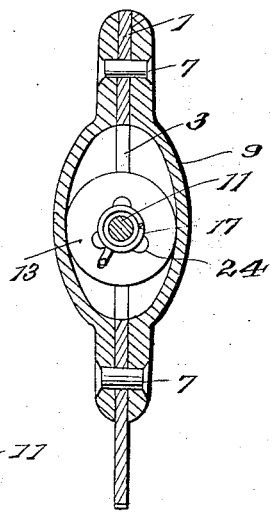
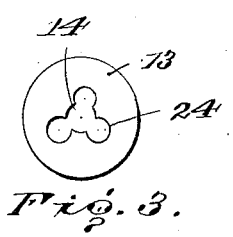
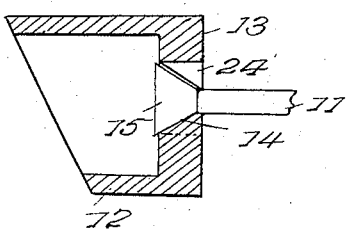
Inventor
F. Culbertson.

UNITED STATES PATENT OFFICE.

FRANK CULBERTSON, OF JACKSON, MISSISSIPPI, ASSIGNOR OF ONE-THIRD TO JOHN MOSAL, OF JACKSON, MISSISSIPPI.

OIL ATTACHMENT FOR HANDSAWS AND THE LIKE.

No. 876,695.          Specification of Letters Patent.          Patented Jan. 14, 1908.

Application filed June 24, 1907. Serial No. 380,578.

*To all whom it may concern:*

Be it known that I, FRANK CULBERTSON, citizen of the United States, residing at Jackson, in the county of Hinds and State of Mississippi, have invented certain new and useful Improvements in Oil Attachments for Handsaws and the Like, of which the following is a specification.

The present invention relates to an improved lubricating device for tools, and is designed more particularly for use in connection with hand saws.

The invention contemplates a reservoir carried by the stock to which the handle of the saw is attached, a novel valve mechanism being mounted within the reservoir for controlling the discharge of the lubricant therefrom.

The primary object of the invention is to construct a reservoir of this character which is simple and inexpensive in its construction and from which the discharge of the lubricant can be readily controlled by the operator without releasing his grip upon the handle or stopping his work.

For a full description of the invention and the merits thereof and also to acquire a knowledge of the details of construction and the means for effecting the result, reference is to be had to the following description and accompanying drawings, in which:

Figure 1 is a side elevation of a saw embodying the invention. Fig. 2 is a transverse sectional view. Fig. 3 is a view of the inner face of the partition at the end of the tube applied to the opening at the discharge end of the reservoir. Fig. 4 is a side elevation of the lubricating device on a larger scale, parts being shown in section. Fig. 5 is a longitudinal sectional view through the tube extending inwardly from the discharge opening.

Corresponding and like parts are referred to in the following description and indicated in all the views of the drawings by the same reference characters.

The invention is shown as applied to a saw comprising a blade 1 similar in shape to the saw blades in common use and provided along one of its longitudinal edges with the usual saw teeth 2. This blade tapers in width toward one end and is provided at its larger end with a notch 3. The saw handle 4 which is of the conventional construction being formed with the hand receiving loop 5 is carried by a stock 6 secured to the saw blade by suitable fastening members such as the rivets 7. This stock 6 comprises two arms 8 carrying a reservoir 9 between them, the said reservoir fitting within the notch 3 while the arms 8 are grooved to receive the portions of the saw blade upon the opposite sides of the notch.

The outer end of the reservoir 9 is formed with a discharge opening 10 controlled by a valve mechanism while the opposite end of the reservoir is provided with a valve for regulating the inlet of air, the two valves being simultaneously operated through the medium of the valve stem 11. A tube 12 extends inwardly from the discharge opening 10 and is closed by a transverse wall 13 having an outwardly flared opening 14 therein, said opening constituting the valve seat. The valve 15 is in the nature of a beveled disk coöperating with the outwardly flared opening 14 to control the discharge of the lubricant, and is attached to the valve stem 11 which is preferably of a size corresponding to the contracted end of the opening 14. In order to facilitate the outflow of the oil or lubricant the contracted inner end of the opening 14 is provided in its periphery with the notches 24 constituting feed openings surrounding the valve stem 11. For the purpose of holding the valve 15 normally upon its seat the valve stem 11 has a collar 16 mounted thereon within the reservoir, and a coil spring 17 surrounding the said stem is interposed between the collar and the transverse wall 13 closing the inner end of the tube 12.

An internally threaded sleeve 18 extends inwardly from the opposite end of the reservoir, the said sleeve receiving a hollow cap 19 which is provided with a suitable head limiting its inward movement and serving as a means for manipulating the same. This hollow cap is also internally threaded and receives at its inner end a plug 20, the said plug and the outer portion of the cap being formed with corresponding openings through which the valve stem 11 extends. The opening through the plug 20 is somewhat larger than the valve stem and is provided preferably toward its outer end with a contracted portion 21. The space within the hollow cap is designed to be filled with packing which can be compressed around the valve stem through the medium of the plug 20.

Located within the outer end portion of the valve stem 11 is a longitudinally extending air passage 22 terminating at its inner end with a lateral branch opening externally upon one side of the valve stem, the opposite end of the air passage being also preferably deflected laterally so as not to be closed by the finger when pressing upon the extremity of the stem 11. This air passage 22 is so arranged that when the valve 15 is seated the inner end of the said passage is closed by the packing within the hollow cap, as shown in Fig. 4, while when the valve stem is pressed inwardly to open the valve 15 the inner end of the air passage 22 is moved beyond the contracted portion 21 of the plug 20 and communicates with the interior of the reservoir, thereby enabling air to readily enter the reservoir and replace the oil being discharged through the discharge opening 10. From an inspection of the drawings it will be observed that the end of the valve stem 11 projects within the hand receiving loop of the handle 4 and can be readily pressed inwardly by the operator to open the valve 15 without the necessity of releasing the grip upon the saw handle or interrupting the operation of the tool.

In the mechanical construction of the lubricating device the valve 15 may be in the nature of a head upon one end of the valve stem and in the present instance is shown as provided upon its outer face with a slot for engagement with a screw driver or like tool. When this valve has been removed it will be readily apparent that the cap 19 can be unscrewed from the sleeve 18 and the valve stem and air inlet valve removed from the reservoir, thereby enabling the parts to be readily adjusted or repaired as may be required. It will be readily apparent that with this construction the valve mechanism can be readily applied to the reservoir or removed therefrom and that filling of the reservoir with oil may be conveniently effected by removing the cap 19 containing the packing and turning the oil into the reservoir around the valve stem.

Having thus described the invention, what is claimed as new is:

1. A lubricating attachment for saws comprising a reservoir mounted upon the saw blade and provided with a discharge opening, a valve controlling the said discharge opening, and a valve stem slidably mounted upon the reservoir for actuating the valve the said valve stem having an air inlet therein which is opened when the valve is opened.

2. A lubricating attachment for saws comprising a reservoir mounted upon the saw blade and provided with a discharge opening, a valve controlling the discharge opening, a valve stem slidably mounted upon the reservoir for actuating the valve, and a spring surrounding the valve stem and normally holding the valve upon its seat, the said valve stem having an air inlet therein which is automatically opened when the valve is opened.

3. A lubricating attachment for saws comprising a reservoir provided with an outwardly flared discharge opening the contracted portion of the opening being formed with a peripheral notch, a valve coöperating with the valve seat, and a valve stem extending through the discharge opening and serving as a means for actuating the valve.

4. In a tool, the combination of a blade, a stock applied to the blade, a reservoir carried by the stock, a valve seat at one end of the reservoir, said valve seat being flared outwardly and the contracted end being formed with notches, a valve coöperating with the valve seat, and a valve stem connected to the valve and passing through the contracted end of the valve seat.

5. A lubricating attachment for saws comprising a reservoir mounted upon the saw blade, a valve mechanism controlling the discharge of the reservoir, a hollow cap for the reservoir, a plug for the hollow cap, and a valve stem extending through the plug and hollow cap and serving as a means for controlling the valve mechanism, the said valve stem being formed wth an air inlet designed to communicate with the interior of the reservoir when the valve is opened.

6. A lubricating attachment for saws comprising a reservoir mounted upon the blade, a valve mechanism controlling the discharge of the reservoir, a sleeve projecting within the reservoir, a hollow cap fitted within the sleeve, a plug for the hollow cap, and a valve stem constituting a means for actuating the valve mechanism and extending through the plug and cap, the said valve stem having an air inlet therein which communicates with the interior of the reservoir when the valve is opened.

In testimony whereof I affix my signature in presence of two witnesses.

FRANK CULBERTSON.

Witnesses:
J. HUNTER TAYLOR,
A. P. LUSK.